United States Patent
Ueno

(10) Patent No.: US 8,971,339 B2
(45) Date of Patent: Mar. 3, 2015

(54) CONTENTS BASE SWITCHING SYSTEM AND CONTENTS BASE SWITCHING METHOD

(75) Inventor: Hiroshi Ueno, Tokyo (JP)

(73) Assignee: NEC Corporation, Tokyo (JP)

( * ) Notice: Subject to any disclaimer, the term of this patent is extended or adjusted under 35 U.S.C. 154(b) by 220 days.

(21) Appl. No.: 13/498,101

(22) PCT Filed: Sep. 21, 2010

(86) PCT No.: PCT/JP2010/066311
§ 371 (c)(1),
(2), (4) Date: Mar. 23, 2012

(87) PCT Pub. No.: WO2011/037105
PCT Pub. Date: Mar. 31, 2011

(65) Prior Publication Data
US 2012/0263186 A1    Oct. 18, 2012

(30) Foreign Application Priority Data

Sep. 25, 2009  (JP) ................................. 2009-221454

(51) Int. Cl.
*H04L 12/28* (2006.01)
*H04L 12/721* (2013.01)
*H04L 12/725* (2013.01)

(52) U.S. Cl.
CPC .............. *H04L 45/38* (2013.01); *H04L 45/306* (2013.01)
USPC ........................................................ 370/401

(58) Field of Classification Search
CPC .................................................... H04L 45/306
USPC .................................. 370/238, 252, 392, 401
See application file for complete search history.

(56) References Cited

U.S. PATENT DOCUMENTS 7,733,882 B2 *  6/2010  Furukawa et al. ............ 370/400
8,149,689 B2 *  4/2012  Endo et al. .................... 370/217
(Continued)

FOREIGN PATENT DOCUMENTS

JP     2002-094561 A    3/2002
JP     2002-124976 A    4/2002
(Continued)

OTHER PUBLICATIONS

International Search Report in PCT/JP2010/066311 dated Dec. 28, 2010 (English Translation Thereof).

*Primary Examiner* — Dang Ton
*Assistant Examiner* — Nourali Mansoury
(74) *Attorney, Agent, or Firm* — McGinn IP Law Group, PLLC

(57) ABSTRACT

In a routing process based on contents of a communication, there is a problem that it is required to carry out switching to refer to the contents every switch on a route or use a routing label. In order to solve the problem, a relay unit terminates data from a transmission source terminal and transfers the contents to a network controller. The network controller assigns flow data which is necessary for relay and issues a flow transfer instruction to a switch. The assigned flow data is notified to the relay unit and the relay unit sets a communication flow to a destination terminal by using the specified flow data, and relays the data to the destination terminal from the transmission source terminal.

14 Claims, 8 Drawing Sheets

(56) References Cited

U.S. PATENT DOCUMENTS

| | | | |
|---|---|---|---|
| 8,179,904 B2 * | 5/2012 | Hidaka et al. | 370/401 |
| 2002/0051449 A1 | 5/2002 | Iwata | |
| 2003/0167352 A1 | 9/2003 | Hoshiai et al. | |
| 2004/0076154 A1 * | 4/2004 | Mizutani et al. | 370/389 |
| 2006/0075136 A1 | 4/2006 | Iwata | |
| 2006/0165053 A1 | 7/2006 | Bhatnagar et al. | |
| 2007/0073838 A1 | 3/2007 | Shizuno | |
| 2007/0204035 A1 | 8/2007 | Hoshiai et al. | |

FOREIGN PATENT DOCUMENTS

| | | |
|---|---|---|
| JP | 2004-304456 A | 10/2004 |
| JP | 2006-203904 A | 8/2006 |
| JP | 2007-096741 A | 4/2007 |

* cited by examiner

Fig. 3A

TRANSFER POLICY TABLE

| | SOURCE ADDRESS | DESTINATION (TEMPORARY) ADDRESS | CONTENT RULE | POLICY ID | QoS PARAMETER |
|---|---|---|---|---|---|
| 1 | IP=any | IP=133.202.1.1 | URI=foo.com | 101 | 10Mbps |
| 2 | IP=any | IP=133.202.2.1 | URI=bar.com | 102 | High-priority |
| ... | ... | ... | ... | ... | ... |

Fig. 3B

FLOW MANAGEMENT TABLE

| | DESTINATION ADDRESS | SOURCE ADDRESS | ROUTE | QoS PARAMETER | POLICY ID | FLOW DATA | KeepAlive |
|---|---|---|---|---|---|---|---|
| 1 | IP=10.1.2.1 | IP=10.0.0.1 | A,B,C,D | 10Mbps | 101 | tcp sp=2001, dp=80 | true |
| 2 | IP=10.1.3.1 | IP=10.0.3.1 | A,E,F,D | High-priority | 102 | tcp sp=2002, dp=80 | false |
| ... | ... | ... | ... | ... | ... | ... | ... |

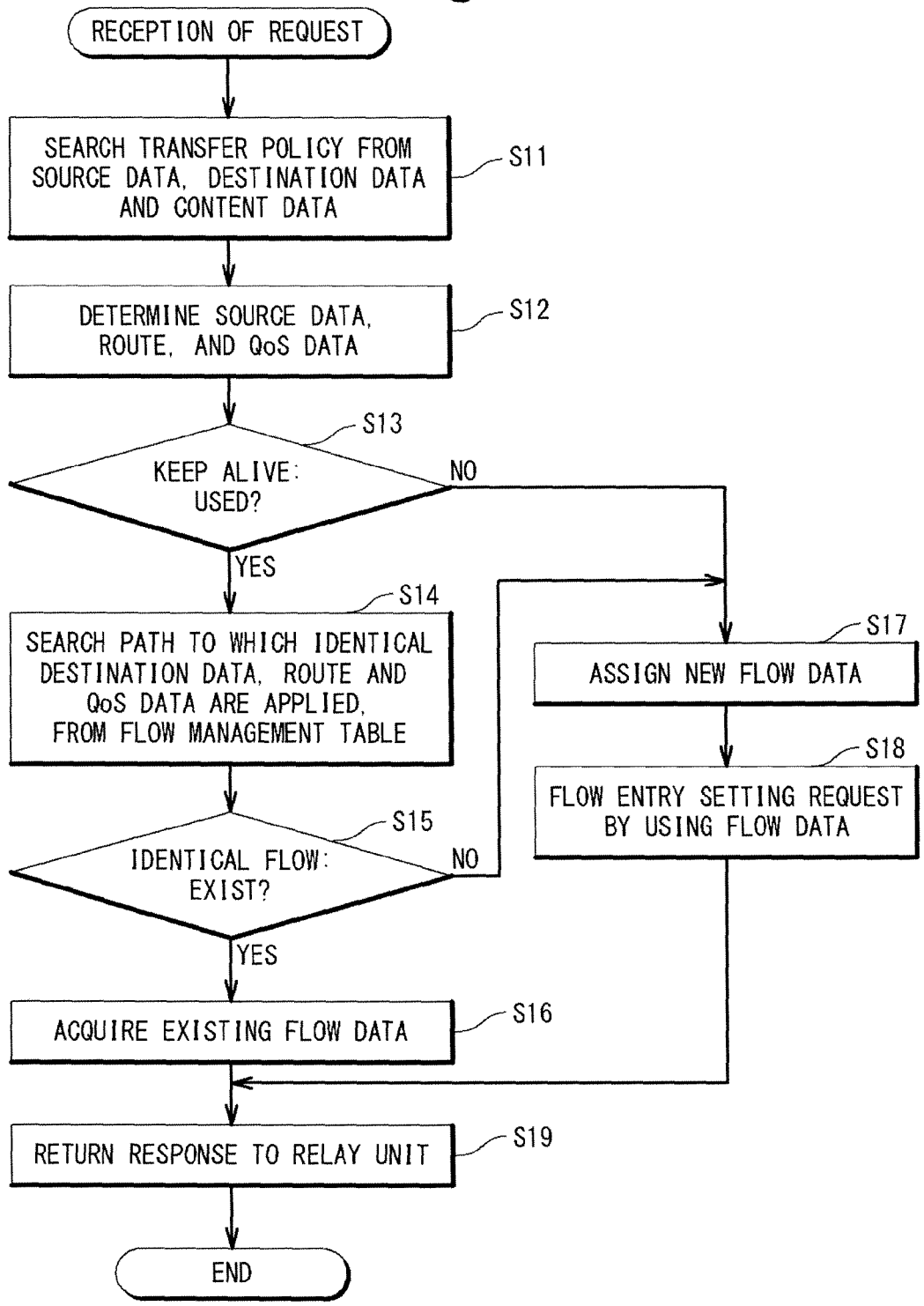

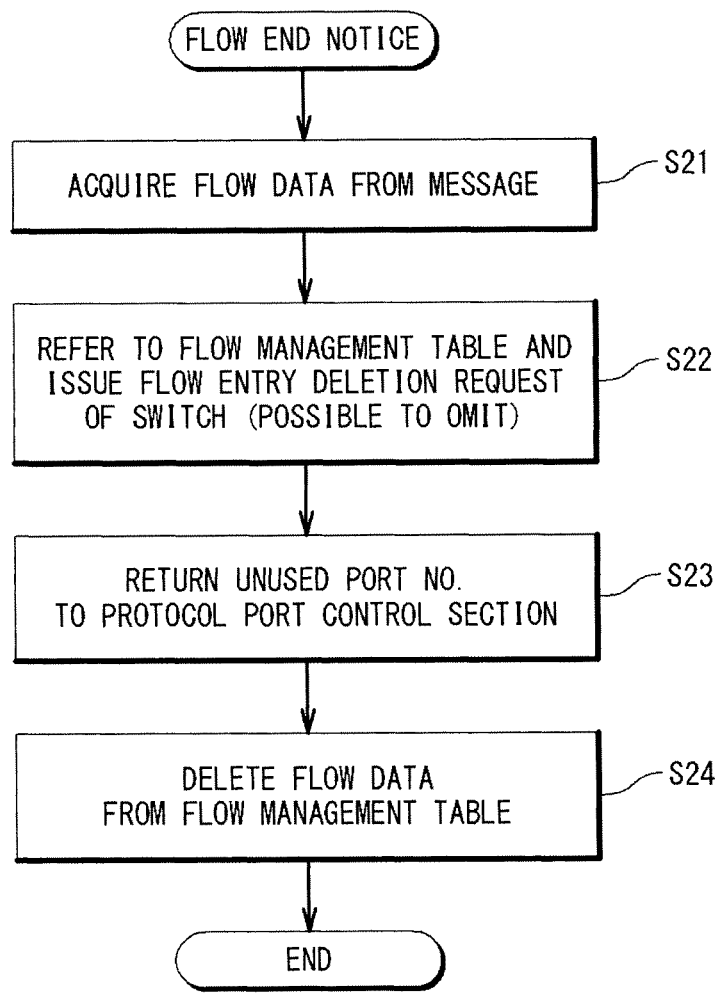

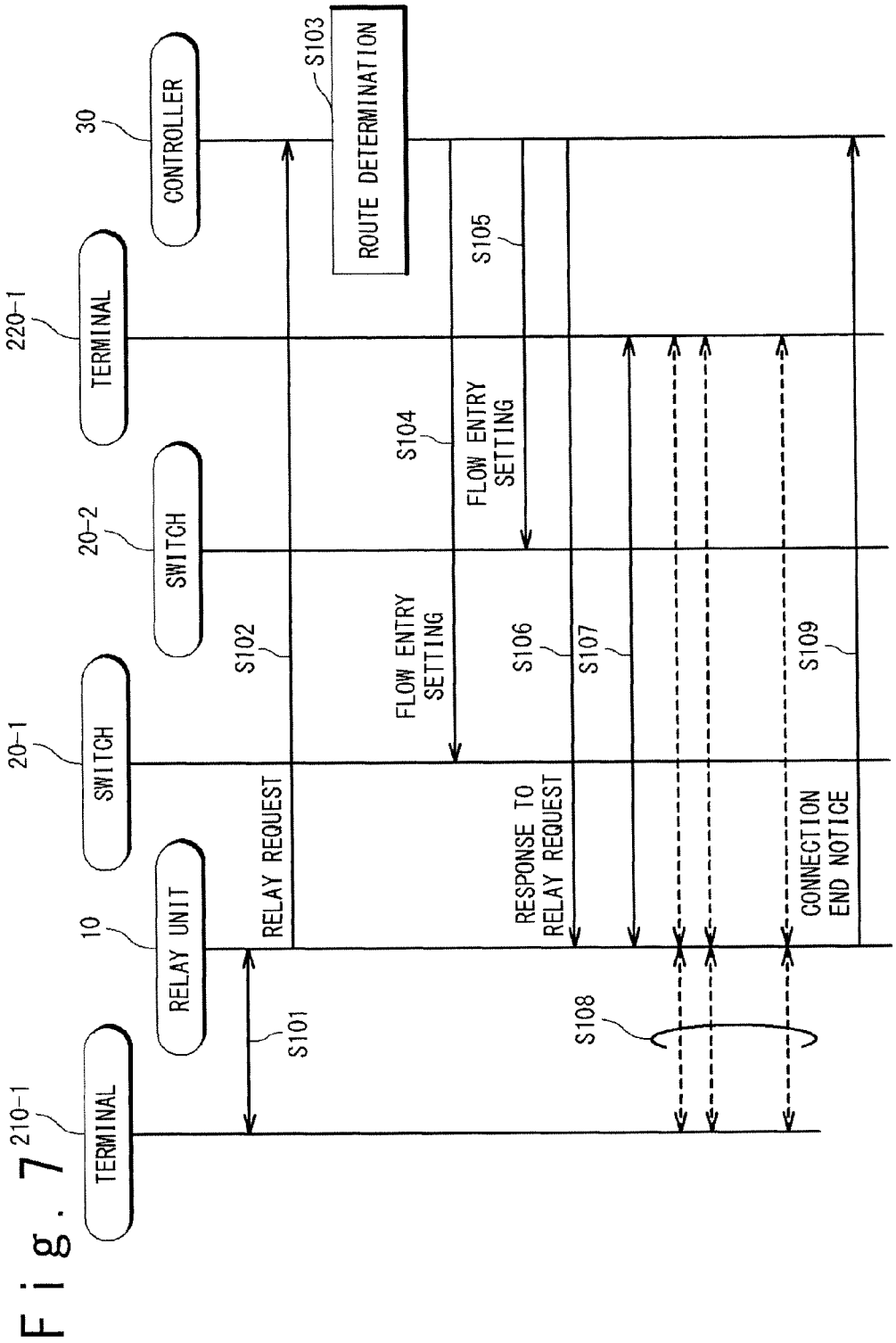

CONTENTS BASE SWITCHING SYSTEM AND CONTENTS BASE SWITCHING METHOD

TECHNICAL FIELD

The present invention is related to a contents based switching system which carries out switch processing and routing processing based on the contents of network traffic in data processing of the network traffic.

BACKGROUND ART

The technique of a contents base router and a contents based network is disclosed in Patent Literature 1 (JP 2006-203904A). In this technique, it is checked whether or not the contents of a data packet and a stored subscription match in an entrance router. When matching to each other, a routing label showing an exit router corresponding to a subscriber of the matched subscription is assigned to the data packet, and the data packet is transmitted to contents based router as a destination. It should be noted that the subscriber shows a user who subscribes to the contents. Also, the subscription shows query data and selection condition which the subscriber prescribes.

In the technique disclosed in Patent Literature 1, the contents data described in meta language called XML (Extensible Markup Language) and subscription data described in XML are made match to each other and a delivery destination is determined.

As a method of realizing the contents based router, there are a method of determining processing in each XML router while the router on a route compares an XML description with an XML query, and a method of adding a label to a packet after determining the destination of the contents and then of carrying out routing based on the label, as in Patent Literature 1.

As processing similar to the routing processing in the contents based router, there is a case that the processing to determine a destination based on message contents of the communication data is carried out. For example, in a load balancer, the processing is carried out to select a destination server based on an identifier contained in a HTTP header called Cookie and URI (Unified Resource Identifier) used in HTTP (Hyper Text Transfer Protocol). However, although the destination server can be selected based on the contents of URI and Cookie, the route cannot be specified by this processing.

In the above-mentioned load balancer, an optimal destination can be selected by applying a policy to URI and a value of Cookie which are contained in a request message of HTTP. Thus, in case of HTTP communication, the server which provides service can be selected. However, even if the optimal server can be selected, it is not possible to specify a network path, because the route to the server follows TCP/IP (Transmission Control Protocol/Internet Protocol). Also, it is not possible to specify a band to be assigned in addition to the network path. Therefore, it is difficult to transfer to specific URI by using the circuit of the broadband.

To realize this, it is necessary that an destination server is determine with URI and Cookie and the routing control is carried out in consideration of QoS (Quality of Service) when being connected with the destination server after the destination server is determined. However, in this case, the policy specification is necessary in each of 2 types of processing of processing of determining a destination server by use of the URI and Cookie, and processing of determining a network path used for the connection to the destination server.

On the other hand, in the contents based network processing shown in Patent Literature 1, a label is assigned to a packet based on the contents and relay processing on the network is carried out based on the label. Therefore, it is possible to specify an optimal route and relay the packet by the contents base router specifying a transfer policy to a label switch when assigning the label to the packet according to the contents.

However, a relay unit called the label switch is required to interpret the label in the transfer processing using the label. The label switch interprets the label and carries out the switching processing based on the label.

Also, in case of using TCP which has reliability, as a transport protocol to deliver the contents, two types of processing are needed of the processing of establishing a TCP connection to an exit router corresponding to a subscriber of a subscription and the processing of specifying a label and transferring the packet. Because a TCP/IP header is added to the packet for the transfer using a TCP connection, it is desired that the transfer processing is carried out on the packet of a TCP/IP form as it is without addition of a label to the header.

As the related technique, Patent Literature 2 (JP 2004-304456A) discloses a technique related to a network management apparatus and a network apparatus which are used for a network system, a method and same system of setting a path. In this technique, the network management apparatus calculates and determines a transfer route which satisfies a specific reference to the contents provided between network apparatuses periodically or at the time of occurrence of a predetermined event. Also, this network management apparatus generates a correspondence table in which the specific contents are related to the calculated transfer route which is optimal to transmission of the contents, and transmits a request message to the network apparatus (edge router) from the correspondence table according to the requested contents by the user. When receiving the request message, the network apparatus (edge router) extracts a passage node list in the concerned message, and sets (establishes) MPLS (Multi-Protocol Label Switching) path by using a predetermined path set signaling (path set message) based on the passage node list.

Also, Patent Literature 3 (JP 2007-096741A) discloses a technique that is related to a port hopping detecting system, a band control system, a port hopping detecting method and a program. In this technique, the port hopping flow detecting apparatus calculates data of the port hopping of a plurality of received flows and detects the port hopping by comparing the calculation result and application data.

CITATION LIST

[Patent Literature 1] JP 2006-203904A
[Patent Literature 2] JP 2004-304456A
[Patent Literature 3] JP 2007-096741A

SUMMARY OF THE INVENTION

An feature of the present invention is to provide a contents based switching system which transfers based on only a TCP/IP header without using a label in transfer processing of contents in case of a contents based packet transfer, in order to perform a contents based routing process efficiently.

A contents based switching system of the present invention which determines a communication route between a plurality of terminals based on contents data contained in a packet payload, the contents based switching system includes a relay unit, a switch and a controller. The relay unit relays a communication between the plurality of terminals based on a predetermined communications protocol, receives data from any of the plurality of terminals, extracts the contents data from the packet payload of the received data, transmits the extracted contents data and address data of the terminal to the controller, and sets a flow to a destination terminal by using flow data specified from the controller. At least one switch is provided on a network which connects between the plurality of terminals, and receives data from any of the plurality of terminals and the relay unit, and carries out the communication with the destination terminal based on a correspondence table of an identifier of the flow data and an output route notified externally. The controller controls the relay unit and the switch, determines a transfer route based on the contents data and the address data of the destination terminal, determines the flow data used for transfer, sets the correspondence table of the flow data and the output route to a route table of the switch on the transfer route, and notifies the determined flow data to the relay unit.

A contents based switching method of the present invention is a contents based switching method of determining a communication route between a plurality of terminals based on contents data contained in a packet payload. In the contents based switching method, a communication between the plurality of terminals is relayed by a relay unit based on a predetermined communications protocol, contents data is extracted from a packet payload, and the extracted contents data and an address data of a terminal are transmitted to a controller. Data is received from any of the plurality of terminals and the relay unit, by at least one switch provided on a network which connects between the plurality of terminals. The relay unit and the switch are controlled by the controller, a transfer route is determined based on the contents data and the address data of the destination terminal, the flow data used for a transfer is determined, the correspondence table of the flow data and the output route is set to the route table of the switch on the transfer route, and the determined flow data is notified to the relay unit. A flow is set by the relay unit, to a destination terminal by using flow data communicated from the controller. The communication to the destination terminal is carried out by the switch, by using an identifier of the flow data notified from the controller.

A program of the present invention is a program to make a computer execute an operation and processing of either of the relay unit, the switch and the controller in the above-mentioned contents based switching method. It should be noted that the program of the present invention can be stored in a storage unit and a storage medium.

According to the present invention, in the contents based network processing, the optimization of a route in the contents based network transfer processing can be realized by relating the contents based destination determination processing, the route determination processing of a network and the control processing of TCP/IP transfer. Also, a flow which can be shared can be determined by relating the network route determination and the flow management by a controller. Thus, the communication flows after relay can be concentrated and the processing load to network resources and terminals can be reduced.

BRIEF DESCRIPTION OF THE DRAWINGS

FIG. 3A is a diagram showing an example of a transfer policy table;

FIG. 3B is a diagram showing an example of a flow management table;

FIG. 5 is a flow chart showing an operation of a network controller which returns a response after receiving a relay request;

FIG. 6 is a flow chart showing an operation of a network controller when a flow ends; and FIG. 7 is a sequence diagram when carrying out routing based on the contents.

DESCRIPTION OF EXEMPLARY EMBODIMENTS

First Exemplary Embodiment

Figure 1:
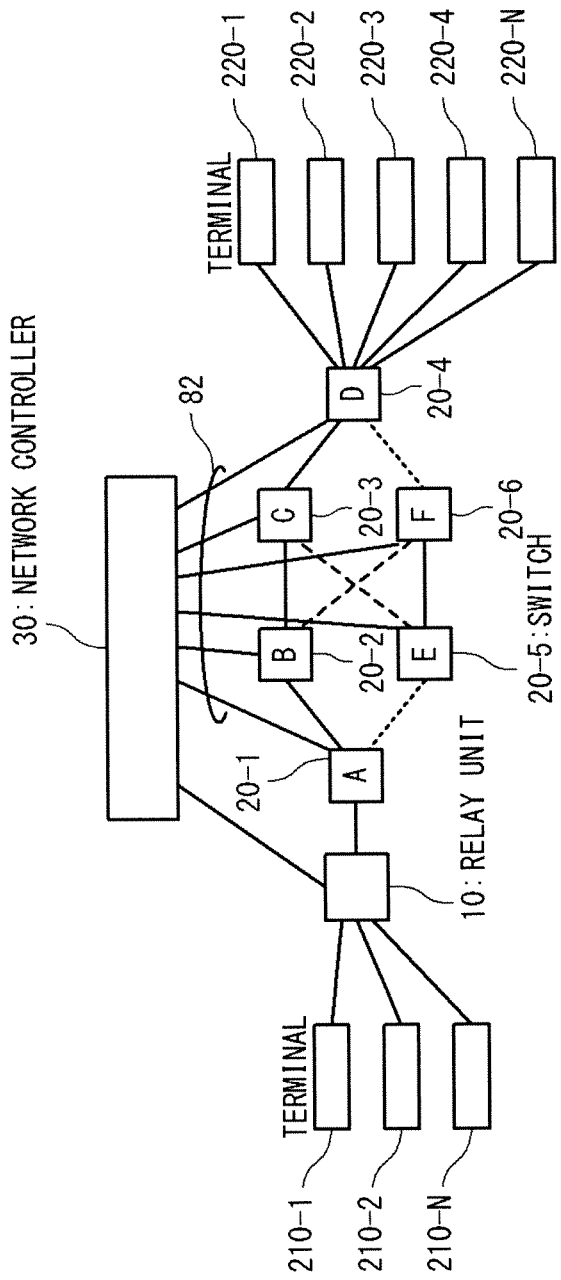
FIG. 1 is a diagram showing a configuration example of a contents based switching system of the present invention.

Hereinafter, a first exemplary embodiment of the present invention will be described with reference to the attached drawings. FIG. 1 shows a configuration example of a contents based switching system of the present invention. The contents based switching system of the present invention is provided with terminals 210 (terminals 210-1 to 210-N: N is a positive integer), terminals 220 (terminals 220-1 to 220-N), a relay unit 10, switches 20 (switches 20-1 to 20-6) and a network controller 30.

Here, the terminal 210 indicates a terminal contained in a group of the terminals 210-1 to 210-N. Also, the terminal 220 indicates a terminal contained in a group of the terminals 220-1 to 220-N. Also, the switch 20 indicates a switch contained in a group of the switches 20-1 to 20-6.

In the following description, each of the terminals 210-1 to 210-N is referred to as the terminal 210. Also, each of the terminals 220-1 to 220-N is referred to as the terminal 220. Also, each of the switches 20-1 to 20-6 is referred to as the switch 20.

The contents based switching system of the present invention provides relay processing between the terminal 210 and the terminal 220.

The relay unit 10 and the switch 20 are connected to a network between the terminals 210 and the terminals 220.

Also, the relay unit 10 and the switch 20 are connected with the network controller 30. The network controller 30 controls network equipments and manages the relay unit 10 and the switch 20 intensively.

It should be noted that in the present invention, the number of terminals and the number of switches are optional and are not limited to the numbers of units shown in FIG. 1.

Figure 2:
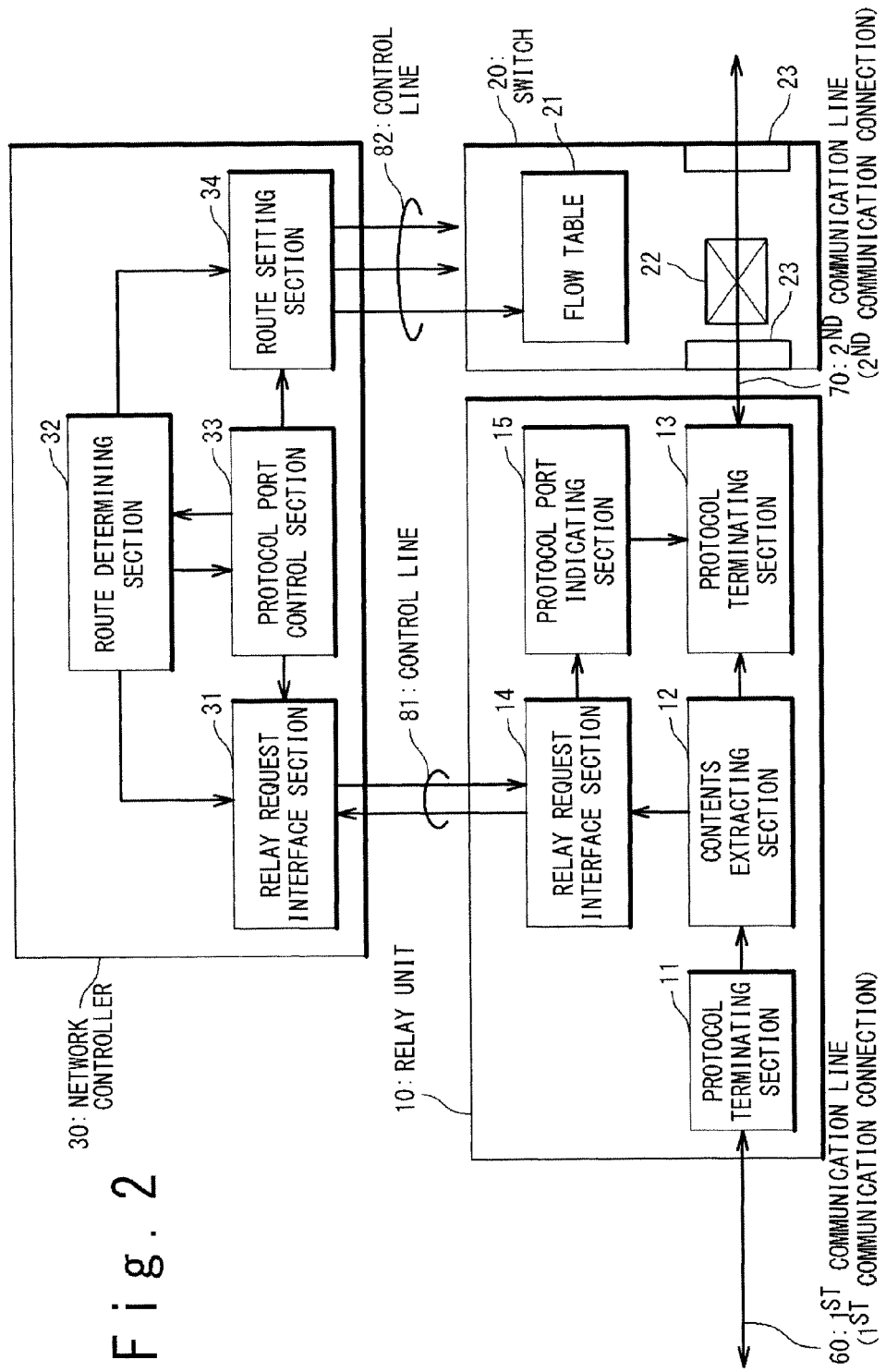
FIG. 2 is a diagram showing a configuration example of a relay unit, a switch and a network controller.

A configuration example of the relay unit 10, the switch 20 and the network controller 30 is shown in FIG. 2.

The relay unit 10 is provided with a protocol terminating section 11, a contents extracting section 12, a protocol terminating section 13, a relay request interface section 14 and a protocol port indicating section 15.

The relay unit 10 is connected with a first communication line 60 and a second communication line 70 and relays between the first communication line 60 and the second communication line 70.

The protocol terminating section 11 is connected with an external unit through the first communication line 60. Also, the protocol terminating section 11 is connected with the contents extracting section 12.

The contents extracting section 12 is connected with the protocol terminating section 11, the protocol terminating section 13 and the relay request interface section 14.

The protocol terminating section 13 is connected with the contents extracting section 12. Also, the protocol terminating section 13 is connected with the switch 20 through the second communication line 70.

The relay request interface section 14 is connected with the network controller 30 through a control line 81, and the contents extracting section 12.

The protocol port indicating section 15 is connected with the protocol terminating section 13 and the relay request interface section 14.

The switch 20 is provided with a flow table 21, a switch processing section 22 and a switch interface section 23.

Data obtained from an MAC header, an IP header, and a layer 4 header is registered in the flow table 21 as flow identification data, and an entry is provided to store output data (an output line and action data such as header rewrite) to the flow.

Example of Flow

Predetermined processing (action) to be carried out to packets which satisfy a predetermined rule (rule) is defined in the flow. The rule of the flow is defined and distinguishable based on various combinations of a transmission destination address, a source address, a destination port and a source port which are contained in the header field of a MAC frame. It should be noted that it is supposed that the above-mentioned addresses contain a MAC (Media Access Control) address and an IP (Internet Protocol) address. Also, data of an entrance port is usable as the rule of the flow, in addition to the above. The details of the flow are described in the following literature: "OpenFlow Switch Specification Version 0.9.0 (Wire Protocol 0x98) Jul. 20, 2009 Current Maintainer" Brandon Heller (brandonh@stanford.edu)" <http://www.openflowswitch.org/documents/openflow-spec-v0.9.0.pdf>

The switch processing section 22 carries out switching from a specific interface to another interface based on the route setting indicated in the flow table 21, and moreover, controls QoS and the bandwidth according to the specified control contents. Here, the switch interface section 23 carries out switching of the switch processing section 22.

The switch interface section 23 accommodates a plurality of lines. Here, the switch interface section 23 is connected with the protocol terminating section 13 of the relay unit 10 through the second communication line 70 and with another switch 20 or another terminal 220. The switch interface section 23 may be configured from separate interfaces which are different in hardware configuration, or may be an identical interface in that only the physical ports are different.

The network controller 30 is provided with a relay request interface section 31, a route determining section 32, a protocol port control section 33 and a route setting section 34.

The relay request interface section 31 is connected with the relay request interface section 14 of the relay unit 10 through a control line 81.

The route determining section 32 is connected with the relay request interface section 31, the protocol port control section 33 and the route setting section 34. Also, the route determining section 32 retains a transfer policy table. The transfer policy table will be described later.

The protocol port control section 33 is connected with the relay request interface section 31 and the route determining section 32. Also, the protocol port control section 33 retains a flow management table. The flow management table will be described later.

The route setting section 34 carries out the setting/update of the flow table 21 of the switch 20 through a control line 82.

Example of the Transfer Policy Table

An example of the transfer policy table retained by the route determining section 32 of the network controller 30 is shown in FIG. 3A. The transfer policy table is used to acquire a policy ID (identifier) and QoS parameter data for the transfer based on contents data and address data of the relay object traffic requested from the relay unit 10. Here, the transfer policy table stores a transmission source address, a transmission destination address (a virtual transmission destination address), a contents rule, a policy ID and a transfer QoS parameter. The route determining section 32 can acquire the policy ID and the transfer QoS parameter from the transfer policy table as a transfer policy corresponding to the transmission source address, the transmission destination address (virtual transmission destination address), and the contents rule. It should be noted that the route determining section 32 can acquire the transfer policy of routing by using the policy ID as an index.

Example of Flow Management Table

An example of the flow management table held in the protocol port control section 33 of the network controller 30 is shown in FIG. 3B. The flow management table stores data of a transfer flow specified with a policy ID. Here, the flow management table stores a transmission destination address, a route, a QoS parameter, a policy ID, flow data, and Keep Alive data. The "Keep Alive" data is data showing whether or not to use "Keep Alive". It should be noted that "Keep Alive" is a communication periodically carried out on the network to confirm whether or not the connection is valid. In this example, if "Keep Alive" is specified, the connection is true, and the otherwise, is false. The route determining section 32 refers to the flow management table to acquire flow data when a route specified to the destination address, QoS parameter, and a policy ID are specified.

Configuration Example of Execution Machine (Computer)

Figure 4:
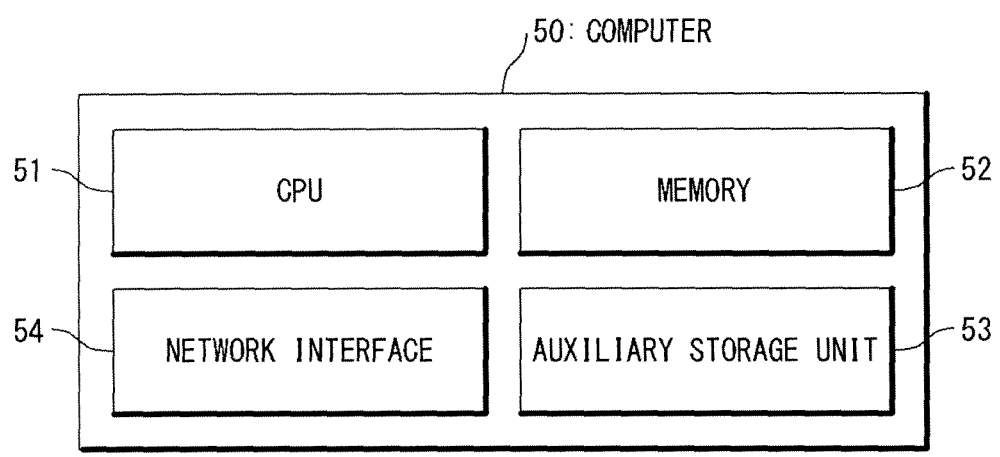
FIG. 4 is a diagram showing a configuration example of an execution machine (computer)

FIG. 4 shows an example of the configuration of the execution machine (computer) in which each processing section of the contents based switching system of the present invention is executed.

When each of the relay unit 10, the switch 20 and the network controller 30 is configured of a computer 50, each of these processing sections is realized by a combination of a CPU (Central Processing Unit) 51, a memory 52, an auxiliary storage unit 53, and a network interface 54.

The CPUs 51 manage the overall operations of the relay unit 10, the switch 20, and the network controller 30 by executing various software programs (computer programs). More specifically, in this exemplary embodiment, the CPUs 51 appropriately acquire software programs through the memory 52 and the auxiliary storage unit 53 or the network interface 54 and execute them to realize functions of the protocol terminating section, the contents extracting section, the route determining section, the route setting section, the protocol port control section and so on. The memory 52 and the auxiliary storage unit 53 stores data received from the CPU 51 and the network interface 54 and provide the stored data in response to a request from the CPU 51. The network interface 54 is connected with communication lines which configure a network among the relay unit 10, the switch 20 and the network controller 30.

It should be noted that the CPU 51 may be a microprocessor, a microcontroller, and a semiconductor integrated circuit (IC) which has a similar function. However, the present invention is not limited to these examples.

The memory 52 is a RAM (Random Access Memory), a ROM (Read Only Memory) for storing a program which is first read upon the power-on, or a semiconductor memory units such as an EEPROM (Electrically Erasable and Programmable Read Only Memory) and a flash memory, which the CPU 51 can directly access. Here, the memory 52 shows a main storage unit (main memory). However, the present invention is not limited to these examples.

The auxiliary storage unit 53 is an auxiliary memory which stores data and programs inside or outside the computer. Here, the auxiliary storage unit 53 shows an external storage unit such as a HDD (Hard Disk Drive) and an SSD (Solid State Drive). Also, the auxiliary storage unit 53 may be a DVD (Digital Versatile Disk), a drive unit and a storage media such as a memory card. However, the present invention is not limited to these examples.

As an example of the network interface 54, a network adapter such as a NIC (Network Interface Card), a communication unit such as an antenna, and communication ports such as a connection port (connector) are exemplified. Also, as an example of the communication lines used by the network interface 54, the Internet, a LAN (Local Area Network), a wireless LAN, a community antenna television system (CATV) line, a fixation telephone network, a mobile telephone network, WiMAX (IEEE 802.16a), 3G (3rd Generation), a lease line (lease line), IrDA (Infrared Data Association), Bluetooth (registered trademark), a serial communication line, a data bus and so on are exemplified. However, the present invention is not limited to these examples.

Relay Processing

Hereinafter, each of functions in case of relay processing from the terminal 210 to the terminal 220 will be described.

Here, a case where the terminal 210-1 is connected to another terminal which provides some service in FIG. 1 will be described. At this time, the terminal 210-1 transmits a packet having an address of the relay unit 10 (which may be a virtual destination) as a destination and tries a TCP connection. This connection request is equivalent to a first communication connection in FIG. 2, and TCP termination processing is carried out in the protocol terminating section 11.

The protocol terminating section 11 takes out a protocol payload of an application layer through the TCP termination processing. As an example of the protocol of the application layer, HTTP (Hyper Text Transfer Protocol), SMTP (Simple Mail Transfer Protocol), and so on are exemplified.

Next, the contents extracting section 12 extracts contents data from the protocol payload. At this time, the contents data is a character string and the character string is specified previously. The contents extracting section 12 extracts the contents data from the protocol payload based on a previously specified character string. As an example of the contents data, in case of HTTP, URI (Unified Resource Identifier) which is contained in the request message and a Cookie character string are exemplified. Or, tag data to be described in XML (eXtended Markup Language) is exemplified.

Here, a case where the contents extracting section 12 extracts the URI character string as the contents data as an example will be described. In this case, the relay request interface section 14 refers to the URI character string extracted by the contents extracting section 12 with a transmission source IP address and a destination IP address on the side of the relay unit as data of the first communication connection, and generates a relay request message. Also, the relay request interface section 14 transmits the relay request message to the network controller 30 via the control line 81.

In the network controller 30, when receiving the relay request message through the control line 81, the relay request interface section 31 notifies the relay request message to the route determining section 32. The route determining section 32 determines the transfer route of the relay request message based on a transfer policy.

It is supposed that the above-mentioned transfer policy is shown in a transfer policy table of FIG. 3A. In this example, in case of any transmission source address, a destination IP address of "133.202.1.1", and when an URI matches "foo.com", it could be seen that "the 1st" entry has the transfer policy ID of "101" and the QoS parameter of "10 Mbps". The route determining section 32 selects a transfer node related to the policy ID. Specifically, the route determining section 32 selects a route corresponding to the policy ID 101 based on the route determination logic. Here, it is supposed that a route which reaches the terminal 220-1 through the switch 20-1, the switch 20-2, the switch 20-3, and the switch 20-4 is selected. The route is a route which passes the switches A, B, C, and D in FIG. 1. Also, it is supposed that the IP address of a destination terminal 220-1 is "10.1.2.1".

Next, the route determining section 32 transfers the destination, the route, and the policy data which are obtained based on a transfer policy determination, to the protocol port control section 33, and searches the flow management table in the protocol port control section 33. If a flow of the same condition is not yet registered, the protocol port number is newly assigned. In case of TCP, a transmission source port number and a destination port number in the TCP are assigned. It should be noted that generally, the destination port number shows a service port number of the server, and takes a fixed value every service of HTTP, SMTP and so on. The transmission source port number is dynamically assigned to make it possible for the connection to be specified. Generally, a port number is paid out from a range equal to or more than address 1024 (equal to or less than address 65535) for registered ports or dynamic and/or private ports.

Also, the route determining section 32 searches the flow management table in the protocol port control section 33, and if a flow of the same condition is registered, and there is specification of "Keep Alive", the route determining section 32 determines that the flow can be used.

In this way, the route determining section 32 determines a flow to be used for the relay request. Next, the route determining section 32 returns the protocol port data and an IP address of the destination terminal to the relay request interface section 31. The protocol port data when using the TCP is the TCP transmission source port number and the TCP destination port number. The relay request interface section 31 transmits these data to the relay unit 10 as a response message.

When receiving the response message from the network controller 30, the relay request interface section 14 of the relay unit 10 transfers the response message to the protocol port indicating section 15. The protocol port indicating section 15 selects a second communication connection based on the response message. If the flow data specified by the response message is new, the protocol port indicating section 15 requests the protocol terminating section 13 based on the specified destination IP address and protocol port data to newly establish the second communication connection. For example, if the flow data specified by the response message is "Keep Alive", the protocol port indicating section 15 specifies a connection using the specified destination IP address and protocol port data.

The specification of the connection by the protocol port indicating section 15 is carried out by searching a socket ID from the address and the protocol port number and by specifying the socket ID in case of OS (Operating System) of the Unix (registered trademark) system. It should be noted that the socket is a network address in which an IP address and a port number as a sub (auxiliary) address of the IP address are combined.

Also, the protocol port indicating section 15 relates a transmission source port number data and a socket in a bind( ) system call, and specifies the socket to use a connect( ) system call, in order to prevent the OS to automatically assign a port number in a new connection. The protocol port indicating section 15 can set the new connection specified with the TCP port number by these commands, and the relay processing using the protocol port number assigned by the network controller 30 can be realized by specifying this socket ID.

Also, the route setting section 34 sets the route determined by the route determining section 32 of the network controller 30 to the switch 20-1, the switch 20-2, the switch 20-3, and the switch 20-4 on the route. Here, the route setting section 34 writes a flow entry in the flow table 21 of the switch 20. For example, in the flow of the entry 1 of the flow management table, the route setting section 34 sets the flow entry which specifies an I/O port to the flow, for "transmission source IP address=10.0.0.1", "destination IP address=10.1.2.1", "transmission source port (sp) of TCP=2001", and "destination port (dp)=80".

Referring to FIG. 5 and FIG. 6, a part which is related with the present invention, of the processing of the network controller 30 will be described.

Request Reception

FIG. 5 is a flow chart showing the processing operation of the network controller 30 from reception of a relay request from the relay unit 10 to returning a response.

(1) Step S11

In the network controller 30, when receiving a relay request message from the relay unit 10, the relay request interface section 31 notifies it to the route determining section 32. The route determining section 32 refers to the transfer policy table in the route determining section 32 based on transmission source data, destination data and contents data which are contained in the relay request message and acquires a transfer policy.

(2) Step S12

The route determining section 32 determines a destination, a route, QoS data based on the acquired transfer policy.

(3) Step S13

The route determining section 32 determines whether or not "Keep Alive" should be used in the acquired transfer policy.

(4) Step S14

When using "Keep Alive" in the acquired transfer policy, the route determining section 32 searches the flow management table in the protocol port control section 33 for an available flow. Specifically, the route determining section 32 searches the flow management table for a path to which the identical destination, route, and QoS are applied, by using these data as a key.

(5) Step S15

The route determining section 32 determines whether or not the identical flow exists.

(6) Step S16

When the identical flow exists, the route determining section 32 acquires the existing flow data.

(7) Step S17

On the other hand, when the identical flow does not exist, the route determining section 32 assigns a new flow because it is not possible to reuse the existing flow. Also, the route determining section 32 assigns a new flow when not using "Keep Alive" at the step S13.

(8) Step S18

When assigning the new flow, the route determining section 32 sets the flow entry corresponding to the flow to at least one switch(es) 20 on the route by the route setting section 34.

(9) Step S19

When the flow data used for the relay is determined through the above processing, the route determining section 32 notifies a response message which contains the flow data, to the relay request interface section 31. The relay request interface section 31 transmits the response message to the relay unit 10.

Flow End Notice

FIG. 6 is a flow chart showing a processing operation of the network controller 30 when the flow ends in the relay unit 10.

(1) Step S21

When receiving a flow end message from the relay unit 10, the relay request interface section 31 of the network controller 30 notifies it to the route determining section 32. The route determining section 32 acquires the flow data from the flow end message.

(2) Step S22

Next, the route determining section 32 refers to the flow management table in the protocol port control section 33, and specifies a route to the destination and issues a flow entry deletion request to the switch(es) 20 on the route. It should be noted that when the flow entry of the switch 20 is automatically deleted through aging processing, non-issuance of the flow entry deletion request is permitted. The aging processing is an interim operation of an equipment to show the original performance.

(3) Step S23

Moreover, the route determining section 32 returns the port number made unused, to the protocol port control section 33. Specifically, the route determining section 32 releases the TCP transmission source port number assigned dynamically in case of the TCP flow, and makes it available for the new assignment.

(4) Step S24

Lastly, the route determining section 32 deletes the flow data from the flow management table in the protocol port control section 33.

Through the above processing, the control data (table entry, port number and so on) related to the flow that the relay processing has been completed, are deleted from the network controller 30 and the switch 20.

As a method of dealing with the flow table 21 in the switch 20 from the network controller 30, there is known "Openflow" (http://www.openflowswitch.org/) and so on. In case of the "Openflow", the route setting section 34 of the network controller 30 is equivalent to "Openflow Controller" and the control circuit 82 is equivalent to "Secure Channel".

Second Exemplary Embodiment

Next, the second exemplary embodiment of the present invention will be described. In the second exemplary embodiment of the present invention, a case where a flow is specified based on only the IP address without specifying the TCP port number in the flow management table of the protocol port control section 33 will be described.

The route determining section 32 of the network controller 30 determines a destination and route to the contents based on the transfer policy table. Here, the route determining section 32 assigns a destination IP address to specify the route and the destination uniquely. The route determining section 32 assigns a different destination IP address to identify a different route while a plurality of destination IP addresses are assigned to the same terminal 220.

Next, the route determining section 32 registers the flow data on the flow management table in the protocol port control section 33. Because the route determining section 32 does not manage the TCP port number, "tcp sp" is not specified in this exemplary embodiment. It should be noted that "tcp sp" shows a TCP transmission source port (sp). Also, the route determining section 32 assigns the destination IP address optionally from the empty addresses and relates it to the actual IP address of the terminal.

The network controller 30 sets the flow entries to the switches for the transfer of the flow having the IP address of the relay unit 10 as a transmission source IP address and the assigned IP address as destination address. Supposing that the transmission source IP address is "10.0.3.1", the destination terminal determined from the contents is 220-4, and the destination IP address is "10.2.2.1", the network controller 30 sets a flow entry to the flow table 21 of the switch 20 on the selected route for the flow in order to transfer between the relay unit 10 ("10.0.3.1") and the terminal 220-4 ("10.2.2.1"). For example, the network controller 30 sets the flow entry to each of the switches 20-1, 20-5, 20-6, and 20-4 for a flow of packets having the IP header of a combination of ("133.202.10.1", "10.2.2.1") as an object flow. It should be noted that when the terminal cannot process a plurality of IP addresses, the IP address is converted in any of the switches on the route such that the packets can reach the terminal 220-4 by using the actual IP address.

When receiving the response message in which the TCP port number is not specified, from the network controller 30, the relay unit 10 autonomously assigns a TCP port number to the terminal 220-4 for establishment of a connection. At this time, the relay unit 10 uses "10.2.2.1" specified in the above-mentioned response message as the destination IP address.

The communication data of this connection is transferred to the terminal 220-4 from the relay unit 10 based on the flow entry set from the network controller 30 to the switch 20, and transfer along the route based on the contents data from the terminal 210-2 to the terminal 220-4 is realized.

Even in case that the used protocol is not TCP but UDP (User Datagram Protocol), the similar processing can be realized by managing a port number.

It should be noted that the above-mentioned exemplary embodiments can be implemented by combining them. For example, the functions corresponding to the contents based switching system according to the above exemplary embodiments of the present invention may be selected.

Example 1

FIG. 7 is a sequence diagram showing a routing operation based on the contents in the relay unit 10 and the network controller 30 in case of the transfer to the terminal 220-1 from the terminal 210-1.

(1) Step S101

The terminal 210-1 transmits data to the relay unit 10. It is assumed that TCP is used for the transport. In this case, TCP connection is carried out for the IP address of the relay unit 10 or the virtual IP address representing a destination terminal group from the terminal 210-1. A TCP connection is carried out according to a sequence called "3-way handshake". The communication of control packets (SYN, SYN-ACK, ACK) is carried out between the terminal 210-1 and the relay unit 10. When the connection establishes, the terminal 210-1 transmits the communication data containing the contents data to the relay unit 10.

(2) Step S102

The relay unit 10 transmits a relay request message which contains the contents data and the IP address data of the terminal 210-1 extracted by the TCP termination a, to the network controller 30, to request the message routing processing based on the contents data.

(3) Step S103

The network controller 30 carries out acquisition of the flow data, the setting of the switch 20, and the routing determination based on the processing sequence described with reference to FIG. 5. The network controller 30 determines a transfer policy to be applied by comparing (checking) the transfer policy and the transmission source IP address and the contents data as the routing determination. Here, the network controller 30 specifies the destination terminal 220-1, the route to the terminal, and the QoS parameter in case of the transfer. For example, when URI contained in HTTP request data is the contents data, the network controller 30 compares a URI character string and a transfer policy, and determines the destination terminal and the transfer route. Moreover, the network controller 30 refers to the flow management table based on the acquired destination, route, and QoS data to acquire the flow data used for the transfer. The flow data contains the communication port data used in the TCP connection from the relay unit 10 to the destination terminal 220.

(4) Step S104

The network controller 30 sets the flow entry to the switch 20-1 on the route based on the acquired flow data, and makes it possible to perform the switching operation between the I/O ports, when the flow data is inputted to the switch 20-1.

(5) Step S105

Similarly, the network controller 30 sets the flow entry to the switch 20-2 on the route based on the acquired flow data, and makes it possible to the switching operation between the I/O ports, when the flow data is inputted to the switch 20-2. The two switches are shown in FIG. 7 but the network controller 30 sets the route to the plurality of switches based on the determined route.

(6) Step S106

The network controller 30 transmits a response message to the relay request message to the relay unit 10 when the above setting ends.

(7) Step S107

The relay unit 10 establishes a communication path to the terminal 220-1 by using a new or existing TCP connection based on the flow data specified in the response message from the network controller 30. When using the new TCP connection, the TCP port number specified from the relay unit 10 to the terminal 220-1 is used. Specifically, the relay unit 10 acquires a socket descriptor by a socket( ) system call in the OS of the Unix (registered trademark) system, and specifies the transmission source port number specified from the network controller 30 as a local address of the socket descriptor by the bind( ) system call. Thus, the relay unit 10 can use not a transmission source port number which the TCP/IP stack autonomously assign but a specified value. Moreover, the relay unit 10 specifies the TCP destination port number showing the IP address of the destination terminal 220-1 and a service by using the connect( ) system call. The TCP connection having the flow data specified by the network controller 30 is established between the relay unit 10 and the terminal 220-1. When a communication path is established, the relay unit 10 transmits the communication message received and retained at the step S101, to the terminal 220-1 as the destination.

(8) Step S108

The relay unit 10 relays a message and communication data between the terminal 210-1 and the terminal 220-1. Since then, the message and the communication data between the terminal 210-1 and the terminal 220-1 are relayed by using the first TCP connection between the terminal 210-1 and the relay unit 10, and the second TCP connection between the relay unit 10 and the terminal 220-1. In case of HTTP GET request, the GET request from the terminal 210-1 is transmitted to the terminal 220-1 through the relay unit 10. Oppositely, the response message from the terminal 220-1 and the contents data such as files specified and acquired by the GET request are transmitted from the network controller 30 to the terminal 210-1 through the relay unit 10. Thus, the routing processing can be realized based on the contents between the terminal 210-1 and the terminal 220-1.

(9) Step S109

Lastly, when the communication between the terminal 210-1 and the terminal 220-1 ends, the relay unit 10 notifies that a corresponding flow has been ended, to the network controller 30. When receiving a flow end data message, the network controller 30 deletes the flow data from the flow management table and sets the TCP port number used in the flow to an unused state to allow to be used again.

In the present invention, the relay unit 10 carries out data transfer by using data (TCP port number) specifying the flow which is notified from the network controller 30. Therefore, the flow data (TCP port number) itself does not show the route (path). That is, the flow data does not specify the route to pass in the TCP connection.

Also, in the present invention, it is possible to carry out the transfer in the form of the TCP/IP header without using an MPLS label.

Also, in the present invention, the relay unit 10 acquires the flow identifier which is notified from the network controller 30 and communicates with the relay unit 10 by using the flow identifier. That is, the relay unit 10 does not autonomously assign a new flow identifier and the network controller 30 assigns the flow identifier.

As mentioned above, the contents based switching system of the present invention which determines a communication route between the plurality of terminals based on the contents contained in the packet payload, includes a relay unit which relays a communication between the plurality of terminals based on a predetermined communication protocol and extracts contents data from the packet payload, and at least one switch which connects between the plurality of terminals, and a controller which is provided with a control function of the relay unit and the switch.

The relay unit transmits the contents data and the address data of the terminal which are extracted from the packet payload of the data received from the terminal to the controller.

The controller determines the transfer route based on the contents data and the address data of the terminal. Moreover, the controller determines the flow data used for the transfer. Also, the controller sets a correspondence table of the flow data and an output path to a route table of the switch on the transfer route. Also, the controller notifies the determined flow data to the relay unit.

The relay unit communicates with the destination terminal by using an identifier of the flow data notified from the controller.

When a communication protocol between the plurality of terminals is TCP, the identifier of the flow data notified to the relay unit from the controller contains either or both of a TCP transmission source port number and a TCP destination port number and an IP address of the destination terminal.

Or, the identifier of the flow data notified to the relay unit from the controller contains at least one of the IP addresses corresponding to the two terminals as endpoints of the communication.

Also, when the communication protocol between the plurality of terminals is UDP, the identifier of the flow data notified to the relay unit from the controller contains either or both of a UDP transmission source port number and a UDP destination port number and an IP address of the destination terminal.

When flow data determined by the controller determines is new in the communication from the relay unit to the destination terminal, the relay unit newly establishes the same flow (IP, UDP, TCP and so on) as the determined flow data and transfers data to the destination terminal.

When the flow data determined by the controller is new in case of a communication from the relay unit to the destination terminal is assigned with flow data on use, the relay unit uses the flow that has been already established to transfer data between the destination terminals.

In the above, the exemplary embodiments of the present invention have been described in detail. Actually, the present invention is not limited to the above-mentioned exemplary embodiments and various modifications are contained in the present invention even if they are made in a range which does not deviate from the present invention.

This patent application claims a priority based on Japanese Patent Application No. JP 2009-221454 and the disclosure thereof is incorporated herein by reference.

The invention claimed is:

1. A contents based switching system which determines a communication route between a plurality of terminals based on contents data contained in a packet payload, said contents based switching system comprising:
a controller;
a relay unit configured to relay a communication between said plurality of terminals based on a predetermined communications protocol, receives data from any of said plurality of terminals, extract the contents data from the packet payload of the received data, transmit the extracted contents data and address data of said received data to said controller, and set a flow to a destination terminal by using flow data specified from said controller; and
at least one switch provided on a network which connects between said plurality of terminals, and configured to receive data from any of said plurality of terminals and said relay unit, and carry out the communication with said destination terminal based on a correspondence table of an identifier of the flow data and an output route notified externally,
wherein said controller controls said relay unit and said switch, determines a transfer route based on the contents data and the address data of said destination terminal, determines the flow data used for transfer, sets the correspondence table of the flow data and the output route to a route table of said switch on the transfer route, and notifies the determined flow data to said relay unit,
wherein said relay unit comprises:
a first protocol terminating section configured to receive a connection request packet destined to an address of said relay unit from any of said plurality of terminals through a first communication connection;
a contents extracting section configured to extract a protocol payload of an application layer from the connection request packet and extract the contents data from the protocol payload;
a second protocol terminating section configured to communicate with said switch through a second communication connection; and
a relay request interface section configured to generate a relay request message based on a transmission source IP address, a destination IP address on a side of said relay unit and the contents data as data of the first communication connection, transmit the relay request message to said controller, and receive a response message from said controller, and
wherein said relay unit requests said second protocol terminating section based on a specified destination IP address and protocol port data to establish a new communication connection as said second communication connection, if the flow data specified based on the response message is new, and requests said second protocol terminating section to use a connection using the specified destination IP address and the protocol port data as said second communication connection, if a specified flow data based on the response message is Keep Alive; and
when determining that a communication flow to said destination terminal from said relay unit comprises a new flow, based on the determined flow data, said relay unit newly establishes a same communication flow as a communication flow shown by the determined flow data and transfers the data to said destination terminal.

2. The contents based switching system according to claim 1, wherein, when a communication protocol between said plurality of terminals comprises Transfer Control Protocol (TCP), an identifier of the determined flow data comprises at least one of a TCP transmission source port number and a TCP destination port number, and an IP address of said destination terminal.

3. The contents based switching system according to claim 2, wherein an identifier of the determined flow data comprises at least one of IP addresses corresponding to two terminals as endpoints of the communication.

4. The contents based switching system according to claim 1, wherein an identifier of the determined flow data comprises at least one of IP addresses corresponding to two terminals as endpoints of the communication.

5. The contents based switching system according to claim 1, wherein, when the communications protocol between said plurality of terminals comprises User Datagram Protocol (UDP), an identifier of the determined flow data comprises at least one of a UDP transmission source port number and a UDP destination port number, and an IP address of said destination terminal.

6. The contents based switching system according to claim 1, wherein, when determining that the communication flow from said relay unit to said destination terminal comprises a flow in a currently used state, based on the determined flow data, said relay unit transfers the data to and from said destination terminal by using an already established flow.

7. The contents based switching system according to claim 1, wherein said controller comprises:
a relay request interface section configured to receive the relay request message from said relay unit, and return the response message containing the determined flow data to said relay unit when the flow data used for relay is determined;
a transfer policy table which stores transmission source data, destination data, the contents data, and a transfer policy;
a flow management table which stores a destination, a route, and Quality of Service (QoS) data;
a route determining section configured to search a transfer policy table based on the transmission source data, the destination data and the contents data contained in the relay request message to acquire the transfer policy, determine the destination, the route, the QoS data based on the transfer policy, determines whether or not a the "keep alive" should be used in the transfer policy, search said flow management table for a path to which the same destination, route, and QoS are applied, by using the destination, the route, the QoS data a key, when using the "keep alive", determines whether or not an identical flow exists, acquire existing flow data when the identical flow exists, assigns a new flow when the identical flow does not exist and when the keep alive is not used, and determine the flow data used for relay; and
a route setting section configured to set a flow entry corresponding to the flow data of the new flow to said switch on the route when assigning the new flow.

8. The contents based switching system according to claim 1, wherein, when the communications protocol between said plurality of terminals comprises User Datagram Protocol (UDP), an identifier of the determined flow data comprises at least one of a UDP transmission source port number and a UDP destination port number, and an IP address of said destination terminal.

9. A contents based switching method in a contents based switching system which determines a communication route between a plurality of terminals based on contents data contained in a packet payload, said contents based switching method comprising:

relaying, by a relay unit, a communication between said plurality of terminals based on a predetermined communications protocol, extracting the content data from the packet payload, and transmitting the extracted contents data and an address data of a terminal to a controller;

receiving data from any of said plurality of terminals and said relay unit, by at least one switch provided on a network which connects between said plurality of terminals;

controlling, by said controller, said relay unit and said switch, determining a transfer route based on the contents data and the address data of said received data, determining flow data used for a transfer, setting a correspondence table of the flow data and an output route to a route table of said switch on the transfer route, and notifying the determined flow data to said relay unit;

setting, by said relay unit, a flow to a destination terminal by using flow data communicated from said controller; and carrying out, by said switch, the communication to said destination terminal by using an identifier of the flow data notified from said controller, wherein said relaying by said relay unit comprises:

receiving, by a first protocol terminating section of said relay unit, a connection request packet destined to an address of said relay unit from one of said plurality of terminals through a first communication connection;

extracting, by a contents extracting section of said relay unit, a protocol payload of an application layer from the connection request packet and extract the contents data from the protocol payload;

communicating with said switch through a second communication connection by a second protocol terminating section of said relay unit; and generating, by a relay request interface section of said relay unit, a relay request message based on a transmission source IP address, a destination IP address on a side of said relay unit and the contents data as data of the first communication connection, transmitting the relay request message to said controller, and receiving a response message from said controller, and wherein said relay unit requests said second protocol terminating section based on a specified destination IP address and protocol port data to establish a new communication connection as said second communication connection, if the flow data specified based on the response message is new, and requests said second protocol terminating section to use a connection using the specified destination IP address and the protocol port data as said second communication connection, if a specified flow data based on the response message is Keep Alive; and wherein said setting a flow comprises:

newly establishing by said relay unit, a same communication flow as a communication flow shown by the determined flow data when it is determined that a communication flow to said destination terminal from said relay unit comprises a new flow, based on the determined flow data, and wherein said carrying out the communication to said destination terminal comprises:

transferring data to said destination terminal.

10. The contents based switching method according to claim 9, wherein, when a communication protocol between said plurality of terminals comprises Transfer Control Protocol (TCP), an identifier of the determined flow data comprises at least one of a TCP transmission source port number and a TCP destination port number, and an IP address of said destination terminal.

11. The contents based switching method according to claim 9, wherein an identifier of the determined flow data comprises at least one of IP addresses corresponding to two terminals as endpoints of the communication.

12. The contents based switching method according to claim 9, wherein, when the communications protocol between said plurality of terminals comprises User Datagram Protocol (UDP), an identifier of the determined flow data comprises at least one of a UDP transmission source port number and a UDP destination port number, and an IP address of said destination terminal.

13. The contents based switching method according to claim 9, wherein said carrying out the communication to said destination terminal comprises:

transferring by said relay unit data to and from said destination terminal by using an already established flow, when it is determined that the communication flow from said relay unit to said destination terminal comprises a flow in a currently used state, based on the determined flow data.

14. A non-transitory computer-readable storage medium which stores a computer-executable program code to attain a contents based switching method in a contents based switching system which determines a communication route between a plurality of terminals based on contents data contained in a packet payload, wherein said contents based switching method comprises:

relaying, by a relay unit, a communication between said plurality of terminals based on a predetermined communications protocol, extracting contents data from a packet payload, and transmitting the extracted contents data and an address data of a terminal to a controller;

receiving data from any of said plurality of tell Unals and said relay unit, by at least one switch provided on a network which connects between said plurality of terminals;

controlling, by said controller, said relay unit and said switch, determining a transfer route based on the contents data and the address data of said received data, determining flow data used for a transfer, setting a correspondence table of the flow data and an output route to a route table of said switch on the transfer route, and notifying the determined flow data to said relay unit;

setting, by said relay unit, a flow to a destination terminal by using the flow data communicated from said controller; and carrying out, by said switch, the communication to said destination terminal by using an identifier of the flow data notified from said controller, wherein said relaying by said relay unit comprises:

receiving, by a first protocol terminating section of said relay unit, a connection request packet destined to an address of said relay unit from one of said plurality of terminals through a first communication connection;

extracting, by a contents extracting section of said relay unit, a protocol payload of an application layer from the connection request packet and extract the contents data from the protocol payload;

communicating with said switch through a second communication connection by a second protocol terminating section of said relay unit; and generating, by a relay request interface section of said relay unit, a relay request message based on a transmission source IP address, a destination IP address on a side of said relay unit and the contents data as data of the first communication connection, transmitting the relay request message to said controller, and receiving a response message from said controller, and wherein said relay unit requests said second protocol terminating section based on a specified destination IP address and protocol port data to establish a new communication connection as said second communication connection, if the flow data specified based on the response message is new, and requests said second protocol terminating section to use a connection using the specified destination IP address and the protocol port data as said second communication connection, if a specified flow data based on the response message is Keep Alive; and when determining that a communication flow to said destination terminal from said relay unit comprises a new flow, based on the determined flow data, said relay unit newly establishes a same communication flow as a communication flow shown by the determined flow data and transfers the data to said destination terminal.

* * * * *